(12) United States Patent
Li

(10) Patent No.: US 6,895,651 B2
(45) Date of Patent: May 24, 2005

(54) METHOD FOR JOINTING METAL COMPONENTS

(75) Inventor: Nien-Lun Li, Hsin-Chuang (TW)

(73) Assignee: Datech Technology Co., Ltd., Taipei Hsien (TW)

( * ) Notice: Subject to any disclaimer, the term of this patent is extended or adjusted under 35 U.S.C. 154(b) by 214 days.

(21) Appl. No.: 10/294,631

(22) Filed: Nov. 15, 2002

(65) Prior Publication Data

US 2004/0055132 A1 Mar. 25, 2004

(30) Foreign Application Priority Data

Sep. 19, 2002 (TW) ...................................... 91214804 U

(51) Int. Cl.[7] .............................................. B23P 11/00
(52) U.S. Cl. .............................. 29/513; 29/524; 29/462
(58) Field of Search .......................... 29/513, 509, 524, 29/243.5, 462; 403/274, 282

(56) References Cited

U.S. PATENT DOCUMENTS

| | | | | |
|---|---|---|---|---|
| 2,164,634 A | * | 7/1939 | Barrett et al. ............... | 403/274 |
| 2,630,175 A | * | 3/1953 | Dickerman ................... | 29/509 |
| 2,900,714 A | * | 8/1959 | Watkins ........................ | 29/513 |
| 3,050,160 A | * | 8/1962 | Chesser ...................... | 403/274 |
| 3,719,986 A | * | 3/1973 | Ardolino et al. .............. | 29/509 |
| 4,404,835 A | * | 9/1983 | Frith ........................... | 29/513 |
| 4,788,395 A | * | 11/1988 | Sakoda ....................... | 29/513 |
| 5,393,106 A | * | 2/1995 | Schroeder ................ | 285/136.1 |
| 5,770,320 A | * | 6/1998 | Hughes et al. .............. | 403/274 |
| 5,839,848 A | | 11/1998 | Sahramaa | |
| 6,131,286 A | * | 10/2000 | Kelly et al. ................... | 29/513 |

* cited by examiner

Primary Examiner—David P. Bryant
(74) Attorney, Agent, or Firm—Troxell Law Office, PLLC

(57) ABSTRACT

A method for joining metal components includes a body and at least a sideboard. A plurality of lock members are installed on a side of the body. Each of the lock members is punched directly and extended into a shape for being cut into two corresponding bending parts. A plurality of holes is installed in the sideboard corresponding to each of the lock members for intersecting the body and the sideboard to combine each other with further press. Additionally, in the present invention, the body connects with each of the sideboard quickly and firmly, and less components and time are required for production.

5 Claims, 5 Drawing Sheets

111

METHOD FOR JOINTING METAL COMPONENTS

REFERENCE CITED

U.S. Pat. No. 5,839,848

FIELD OF THE INVENTION

The present invention relates to a method for joining metal components, and particularly, to a structure suitable to join metal components or similar devices. In the present invention, a plurality of lock members is installed on a side of the body. Each of the lock members is punched directly and extended into a shape for being cut into two corresponding bending parts. Therefore, this invention can be employed an easy and quick connective process to economize on material during production.

BACKGROUND OF THE INVENTION

In general, due to the continuous development of technology and more and more new type of electric appliance, methods for joining metal components are always importance. Additionally, various methods for joining metal components come into existence.

Most of those methods for joining metal components connect a body with a sideboard. A plurality of lock member is formed by cut the side of the body. A plurality of holes is installed in the sideboard corresponding to each of the lock members for joining the body with the sideboard. Although the method by cutting the body to form a plurality of lock member has achieved the purpose of making the body connect with the sideboard, however, a great deal of components and operating time are required. The cost of manufacturing then increases. That is to say, the method in the prior art has several defects, such as time-consuming, manufacturing times increasing, and so forth.

In view of the various disadvantages of method, the present invention addresses the disadvantages by researching solutions for them which, following continuous research and improvements, culminated in the method easy and convenient for joining metal components of the invention herein, a method capable of eliminating the numerous drawbacks of the conventional technology.

SUMMARY OF THE INVENTION

The main objective of the present invention is to provide a method for joining metal components. Whereby, each of lock members on the side of the body is punched directly and extended into a shape for being cut into two corresponding bending parts. Thus, fewer components are required and cost substantially will be reduced.

Another objective of the present invention is to provide a method for joining metal components. Whereby, each of lock members on the side of the body is punched directly and extended into a shape for being cut into two corresponding bending parts. Thus, manufacturing times and time-consuming are substantially reduced so as to further speed up production.

The other objective of the present invention is to provide a method for joining metal components. Whereby, each of lock members of the body is cut into two corresponding bending parts, which are crooked toward outside. The lock members quickly intersect with each of the corresponding holes in the sideboard for firmly combining the bending parts of the body with the sideboard with further pressing on each of the bending parts of the body to enhance the practicality.

To achieve the above objectives, the present invention connects a body with at least a sideboard. A plurality of lock members is installed on a side of the body. Each of the lock members is punched directly and extended into a shape for being cut into two corresponding bending parts. A plurality of holes is installed in the sideboard corresponding to each of the lock members for intersecting the body and the sideboard to combine each other with further press. Whereby the body connects with each of the sideboard quickly and firmly, and less components and time are required to further enhance the practicality.

In order to make characteristics and configuration of the present invention fully understood, a detail embodiment is described as follows:

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

Figure 1:
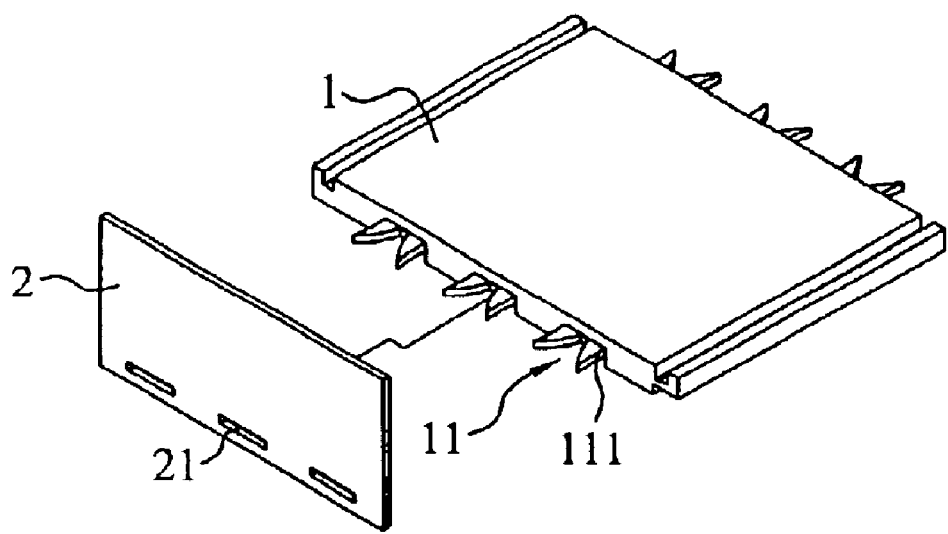
FIG. 1 shows a perspective diagram in a separation configuration according to an embodiment of the present invention.

According to the disadvantages of conventional battery as described above, the present invention provides an improvement solution for that. Embodiments of this invention will be described in detail with reference to attached drawings.

Referring to FIG. 1 to FIG. 3A. the present invention provides a method for joining metal components including a body 1 and at least a sideboard 2.

The body 1 is a square block. A plurality of lock members 11 is installed on both sides of the body 1. Each of the lock members 11 is punched directly and extended into a shape. (Wherein, the lock members 11 are punched directly on single side and extended above or below the side of the body 1. Besides, the lock members 11 may also be punched on single side and extended in the middle of the side of the body 1.) Each of the lock member 11 is cut into two corresponding arc bending parts 111 crooked toward outside.

A plurality of holes 21 are located in the sideboard 2 corresponding to each of the lock members 11 of the body 1 for intersecting adjoining the body 1 with the sideboard 2. The bending parts 111 of the body 1 are pressed to make the bending parts 111 of the body 1 tightly clip to the sideboard 2.

Figure 4:
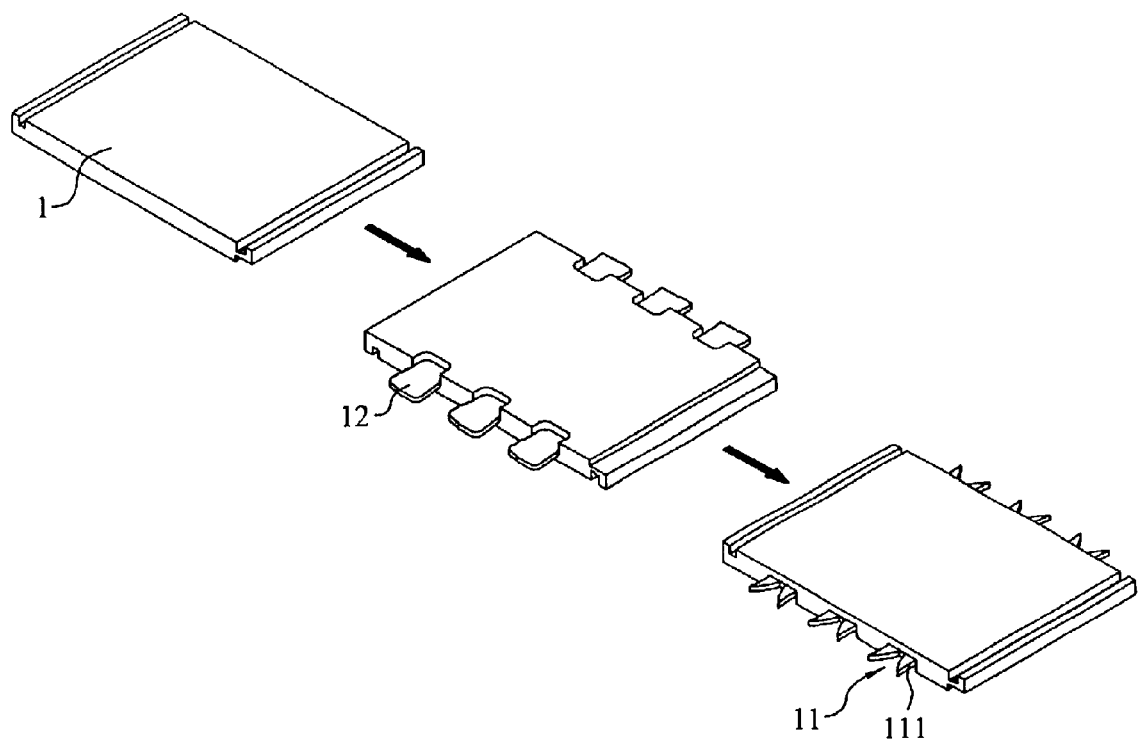
FIG. 4 shows a perspective diagram of the forming process of lock members of the body according to an embodiment of the present invention.

Referring to FIG. 4, the both sides of the body 1 are punched by machines to make the body 1 of metal material pressed vertically. The body 1 is outward extended to be an extension part 12. Then, the extension part 12 is cut into two corresponding bending parts 111 crooked toward outside to form the lock members 11.

Figure 2:
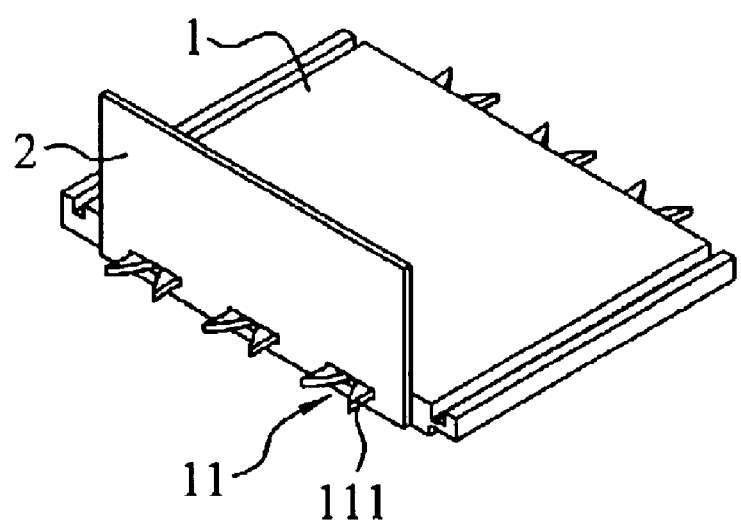
FIG. 2 shows a perspective diagram in a combination configuration according to an embodiment of the present invention.
Figure 3:
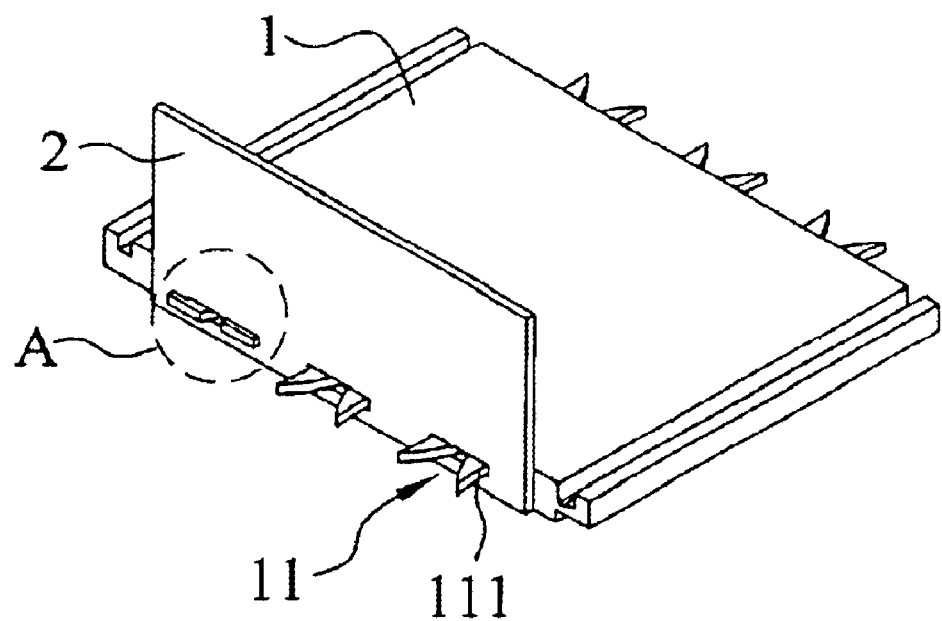
FIG. 3 shows a perspective diagram of a body and a sideboard in a combination configuration according to an embodiment of the present invention.
Figure 3A:
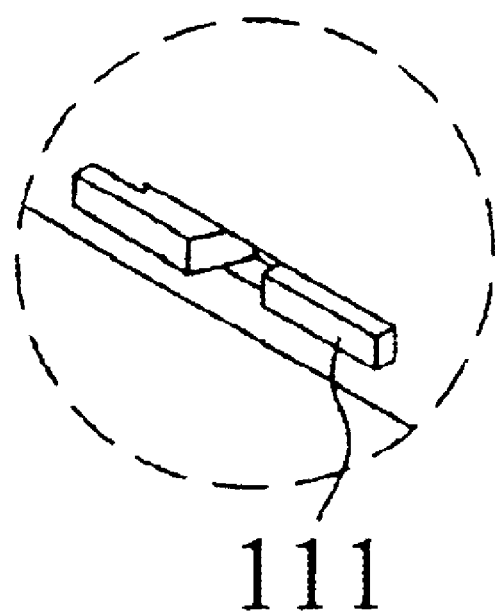
FIG. 3A shows an enlarged view of area A in FIG. 3.

Furthermore, Please Referring to FIG. 1 to FIG. 3, the characteristics of the present invention is that the lock members 11 are installed on the side of the body 1. With each of the lock member 11 punched directly and extended into a shape, a great deal of components and time are reduced so as to further speed up the production. Besides, each of the lock members 11 is cut into two corresponding bending parts 111 crooked toward outside, which intersects with the corresponding holes 21 in the sideboard 2 for further combining the body 1 and the sideboard 2. The curve bending parts 111 of the body 1 is pressed to make the bending parts 111 of the body 1 tightly clip to the sideboard 2. Therefore, the present invention has firm configuration and requires less components and time that enhance the productivity.

Additionally, the present invention has the following advantages:

1. In the present invention, each of the lock members on the side of the body is punched directly and extended into a shape for being cut into two corresponding bending parts. Thus, The method economize on material during production and cost substantially is reduced.
2. In the present invention, each of lock members on the side of the body is punched directly and extended into a shape for being cut into two corresponding bending parts. Thus, manufacturing times and time-consuming are substantially reduced for further speeding up production.
3. In the present invention, each of lock members is cut into two corresponding bending parts, which are crooked toward outside for intersecting with each of the corresponding holes in the sideboard for further combining the bending parts of the body and the sideboard. The curve bending parts of the body is pressed to make the bending parts of the body tightly clip to the sideboard for quickly and firmly combination and enhancement of the practicality.

The present invention has been described above with reference to a preferred embodiment. However, other embodiments not shown herein equally possible within the scope of the invention is in the scope of the present invention. Various changes, modifications, and enhancements could be made therein without departing from the scope of the present invention as set forth in the following claims. Moreover, it will be apparent that other alternative embodiments and methods of implementation or modification may be employed without departing from the true spirit and scope of the invention. Thus, characteristics of the present invention are firm configuration, less components and time required, and manufacturing-speed increase for further enhancing the productivity. The present invention is suitable to join all kinds of metal components and meets the requirement of the practical utility for patent application.

What is claimed is:

1. A method for joining a metal body and a side board, which comprises the steps of:
   a) pressing the metal body and forming a plurality of extension parts extending from at least one side of the metal body;
   b) cutting each extension part of the plurality of extension parts into a pair of arc bending parts;
   c) inserting one pair of arc bending parts into each hole of a plurality of holes in the side board; and
   d) bending each pair of arc bending parts and connecting the sideboard to the metal body.

2. The method according to claim 1, wherein in the bending step d) a first bending part of each pair of bending parts is bent parallel with the at least one side of the metal body in a direction opposite a second bending part of each pair of bending parts.

3. The method according to claim 1, wherein in the pressing and forming step a) each of the plurality of extension parts are located below the at least one side.

4. The method according to claim 1, wherein in the pressing and forming step a) each of the plurality of extension parts are located above the at least one side.

5. The method according to claim 1, wherein in the pressing and forming step a) each of the plurality of extension parts are located in a middle of the at least one side.

* * * * *